United States Patent
Fujiwara (10) Patent No.: US 10,462,319 B2
(45) Date of Patent: Oct. 29, 2019

(54) IMAGE READING APPARATUS TRANSMITTING DEVICE IDENTIFICATION INFORMATION AND READING INFORMATION TO PUSH NOTIFICATION SERVER, AND METHOD FOR CONTROLLING THE IMAGE READING APPARATUS

(71) Applicant: BROTHER KOGYO KABUSHIKI KAISHA, Nagoya, Aichi (JP)

(72) Inventor: Susumu Fujiwara, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/956,100

(22) Filed: Apr. 18, 2018

(65) Prior Publication Data
US 2018/0338054 A1 Nov. 22, 2018

(30) Foreign Application Priority Data
May 18, 2017 (JP) ................................ 2017-098765

(51) Int. Cl.
*H04N 1/00* (2006.01)
*H04L 29/12* (2006.01)
*H04L 29/08* (2006.01)

(52) U.S. Cl.
CPC ....... *H04N 1/00771* (2013.01); *H04L 61/103* (2013.01); *H04L 61/6022* (2013.01);
(Continued)

(58) Field of Classification Search
CPC .......................... H04N 1/32609; G06F 3/1236
See application file for complete search history.

(56) References Cited

U.S. PATENT DOCUMENTS 6,880,019 B1 * 4/2005 Toyoda .............. H04N 1/00214
709/200
2002/0191211 A1 * 12/2002 Miller .................. G06F 3/1204
358/1.15
(Continued)

FOREIGN PATENT DOCUMENTS

| JP | 2013-186672 A | 9/2013 |
| JP | 2013-232086 A | 11/2013 |
| JP | 2016-015580 A | 1/2016 |

*Primary Examiner* — Ibrahim Siddo
(74) *Attorney, Agent, or Firm* — Scully, Scott, Murphy & Presser, P.C.

(57) ABSTRACT

In an image reading apparatus, a processor receives an input instructing to control the scanner to read an original, and controls the scanner to generate image data by reading the original. The processor receives device identification information identifying an information processing apparatus from the information processing apparatus. The process executes a first process and a second process. The first process includes: transmitting to a push notification server via the communication interface the received device identification information and reading information, the reading information including at least one of information specifying the controlling the scanner is start and information specifying the controlling the scanner is complete; receiving request information from the information processing apparatus via the communication interface; and transmitting the generated image data to the information processing apparatus in response to receiving the request information.

19 Claims, 8 Drawing Sheets

(52) U.S. Cl.
    CPC .............. *H04L 67/04* (2013.01); *H04L 67/10* (2013.01); *H04L 67/26* (2013.01); *H04N 1/00766* (2013.01); *H04N 1/00095* (2013.01)

(56) References Cited

U.S. PATENT DOCUMENTS

| | | | |
|---|---|---|---|
| 2003/0184653 A1* | 10/2003 | Ohkubo | G06F 19/00 348/207.1 |
| 2004/0018839 A1* | 1/2004 | Andric | H04L 12/2856 455/433 |
| 2010/0079823 A1* | 4/2010 | Miyazawa | H04N 1/00222 358/474 |
| 2012/0294352 A1* | 11/2012 | Koum | H04N 21/234309 375/240.01 |
| 2013/0235421 A1 | 9/2013 | Ono et al. | |
| 2013/0258405 A1* | 10/2013 | Tsuya | G06F 3/1293 358/1.15 |
| 2014/0036309 A1* | 2/2014 | Oguma | G06F 3/12 358/1.15 |

* cited by examiner

IMAGE READING APPARATUS TRANSMITTING DEVICE IDENTIFICATION INFORMATION AND READING INFORMATION TO PUSH NOTIFICATION SERVER, AND METHOD FOR CONTROLLING THE IMAGE READING APPARATUS

CROSS REFERENCE TO RELATED APPLICATION

This application claims priority from Japanese Patent Application No. 2017-098765 filed May 18, 2017. The entire content of the priority application is incorporated herein by reference.

TECHNICAL FIELD

The present disclosure relates to an image reading apparatus that implements push scanning for pushing image data to an information processing apparatus set as the destination.

BACKGROUND

Generally, a conventional image reading apparatus is capable of reading images and transmitting image data representing the read image to an image processing apparatus connected to the same LAN. Specifically, the image reading apparatus performs a so called push scan. In the push scan, a user issues a command to the image reading apparatus to initiate scanning. Subsequently, the image reading apparatus reads an original to generate image data and transmits the image data to the specified information processing apparatus on the LAN.

When the user of the conventional image reading apparatus performs an operation on the apparatus, i.e., pushes a button, for instructing the image reading apparatus to start scanning, the image reading apparatus transmits information specifying a scan start (scan key event) to the information processing apparatus. Through a driver installed on the information processing apparatus, the information processing apparatus transmits a scan start request to the image reading apparatus. After receiving the scan start request, the image reading apparatus reads the image and transmits the resulting image data to the information processing apparatus.

SUMMARY

However, with the conventional technology described above, the information processing apparatus must start a program such as a driver or a service prior to receiving information transmitted from the image reading apparatus in response to the user command. This increases the operating load on the information processing apparatus.

In view of the foregoing, it is an object of the present disclosure to implement a push scan without requiring an information processing apparatus to start up a program or service prior to receiving information used in the push scan.

In order to attain the above and other objects, the disclosure provides an image reading apparatus. The image reading apparatus includes an operation interface, a reading machine, a communication interface, a processor, and a memory. The memory stores computer readable instructions, the computer readable instructions, when executed by the processor, causing the image reading apparatus to perform: receiving via the operation interface an input instructing to control the scanner to read an original; controlling the scanner to generate image data by reading the original on a basis of the input; receiving device identification information identifying an information processing apparatus from the information processing apparatus via the communication interface; and executing a first process including: transmitting to a push notification server via the communication interface the received device identification information and reading information, the reading information including at least one of information specifying the controlling the scanner is start and information specifying the controlling the scanner is complete; receiving request information from the information processing apparatus via the communication interface, wherein the request information is transmitted from the information processing apparatus when the information processing apparatus receives a push notification including the reading information from the push notification server; and transmitting the generated image data to the information processing apparatus via the communication interface in response to receiving the request information.

According to another aspect, the disclosure provides an image reading apparatus. The image reading apparatus includes an operation interface, a reading machine, a communication interface, a processor, and a memory. The memory stores computer readable instructions, the computer readable instructions, when executed by the processor, causing the image reading apparatus to perform: receiving via the operation interface an input instructing to control the scanner to read an original; controlling the scanner to generate image data by reading the original on a basis of the input; receiving device identification information identifying an information processing apparatus from the information processing apparatus via the communication interface; and transmitting to a push notification server via the communication interface the received device identification information and reading information on reading the original so as to prompt the push notification server to transmit to the information processing apparatus push notification information including the reading information.

According to still another aspect, the disclosure provides a method for controlling an image reading apparatus including an operation interface, a scanner, a communication interface, and a memory storing location information of a cloud server on a network. The method includes: receiving via the operation interface an input instructing to control the scanner to read an original; controlling the scanner to generate image data by reading the original on a basis of the input; receiving device identification information identifying an information processing apparatus from the information processing apparatus via the communication interface; determining whether a prescribed condition is met, the prescribed condition including a condition that the image reading apparatus and the information processing apparatus exist on a same local area network; in a case where it is determined that that the prescribed condition is met, executing a first process including: transmitting to a push notification server via the communication interface the received device identification information and reading information, the reading information including at least one of information specifying the controlling the scanner is start and information specifying the controlling the scanner is complete; receiving request information from the information processing apparatus via the communication interface, wherein the request information is transmitted when the information processing apparatus receives a push notification including the reading information from the push notification server; and transmitting the generated image data to the information processing apparatus via the communication interface in response to receiving the request information; and in a case where it is determined that that the prescribed condition is not met, executing a second process including: transmitting the generated image data to the cloud server via the communication interface; and transmitting to the push notification server via the communication interface the received device identification information, the reading information, and the stored location information.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
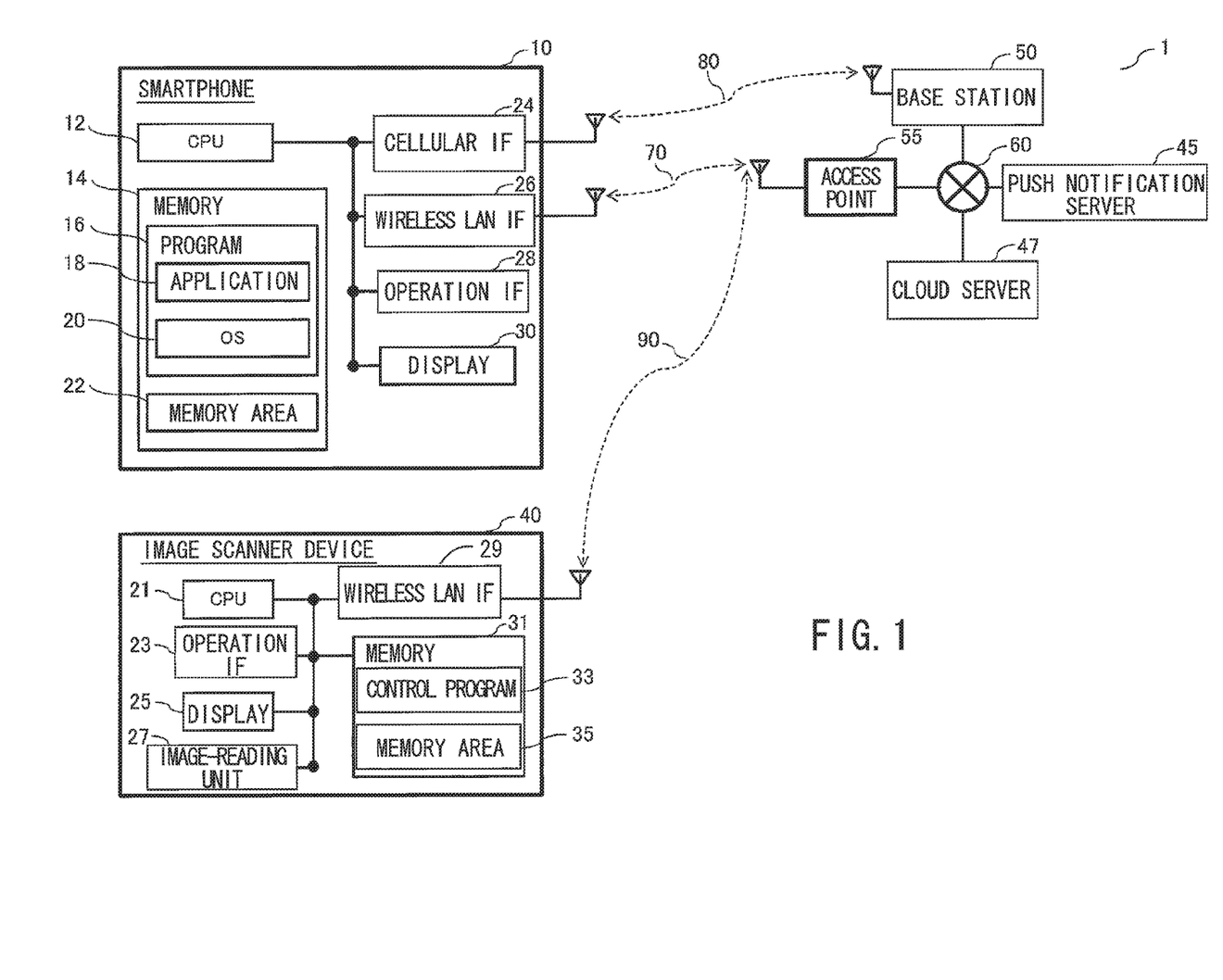
FIG. 1 is a block diagram illustrating a communication system according to an embodiment.

FIG. 1 is a block diagram showing a communication system 1 as an embodiment of the present disclosure. The communication system 1 is provided with a smartphone 10, a image scanner device 40, a push notification server 45, a cloud server 47, a base station 50, and an access point 55. The access point 55 is a well-known relay device. The push notification server 45 and the cloud server 47 are configured to communicate with the smartphone 10 via an Internet 60 and the base station 50. The push notification server 45 and the cloud server 47 are also configured to communicate with the image scanner device 40 via the Internet 60. The push notification server 45 and the cloud server 47 are also configured to communicate with the smartphone 10 and the image scanner device 40 via the Internet 60 and the access point 55.

Note that while the single smartphone 10 and the single image scanner device 40 are provided in the communication system 1 of this example, the communication system 1 may have a plurality of portable terminals 10 and a plurality of scanners 40. Further, the image scanner device 40 may be replaced with a multifunction peripheral provided with a printer function, a scanner function, and a fax function, and the smartphone 10 may be replaced with a personal computer.

Structure of the Smartphone 10

The smartphone 10 is a portable device that may run the Android (registered trademark of Google LLC) or iOS (registered trademark of Cisco Systems, Inc.) mobile operating system. The smartphone 10 primarily includes a CPU 12, a memory 14, a cellular interface 24, a wireless LAN interface 26, an operation interface 28, and a display 30. These components of the smartphone 10 are interconnected.

The CPU 12 is connected to the memory 14, the cellular interface 24, the wireless LAN interface 26, the operation interface 28, and the display 30. The CPU 12 controls the various functions of the smartphone 10 according to a program 16 stored in the memory 14 and according to signals exchanged over the cellular interface 24 and the wireless LAN interface 26, and the like. By reading the program 16, the CPU 12 functions as various means.

As an example, the memory 14 may be configured of RAM, ROM, flash memory, a hard disk drive, and the like. The memory 14 has a memory area 22 for storing the program 16 and required information. The memory area 22 also is configured to store the MAC address of the smartphone 10. The program 16 includes an application 18, and an operating system (OS) 20. The OS 20 is a program that provides functions for displaying various images on the display 30, and basic functions used by the application 18. The OS 20 also provides an application programming interface (API) through which the application 18 issues commands to various hardware. The application 18 is a program provided by the vendor of the image scanner device 40. The application 18 may be downloaded and installed on the smartphone 10 from a server (not shown) on the Internet 60 or may be installed on the smartphone 10 from media bundled together with the image scanner device 40. Here, the phrase "the CPU 12 acquires data while executing the application 18" may signify a process in which the CPU 12 receives data outputted by the OS 20.

The cellular interface 24 performs wireless communications 80 with the base station 50. The wireless communications 80 may be implemented according to the 3G or 4G cellular standard. The wireless LAN interface 26 is an interface (i.e., a chip or communication circuit) for implementing wireless communications according to Wi-Fi technology specified by the Wi-Fi Alliance (hereinafter called "Wi-Fi communications"). The wireless LAN interface 26 is configured to communicate with a wireless LAN interface 29 of the image scanner device 40 through wireless communications 70 and wireless communications 90 via the access point 55 in the infrastructure mode. Since the user moves while carrying the smartphone 10, the wireless communications 70 may be interrupted after a wireless connection is initially established. When a wireless connection is established for the wireless communications 70, the smartphone 10 and the image scanner device 40 exist on the same LAN via the access point 55.

The operation interface 28 includes keys for executing functions on the smartphone 10 and is configured to transmit signals, which may represent desired commands, to the CPU 12 according to user operations on the keys. The operation interface 28 may also be integrally configured with the display 30 as a touchscreen. The display 30 displays information on the various functions of the smartphone 10. The display 30 also displays various information in screens (not shown) according to commands received from the CPU 12.

Structure of the Image scanner device 40

The image scanner device 40 includes a CPU 21, an operation interface 23, a display 25, an image-reading unit 27, the wireless LAN interface 29, and a memory 31. These components of the image scanner device 40 are interconnected. Since the configuration of the wireless LAN interface 29 is substantially identical to that of the wireless LAN interface 26 described above, a description of the wireless LAN interface 29 will be omitted.

The CPU 21 is connected to the operation interface 23, the display 25, the image-reading unit 27, the wireless LAN interface 29, and the memory 31. The CPU 21 controls the components of the image scanner device 40 by executing a control program 33 stored in the memory 31 and based on various information from the operation interface 23 and various information from communication devices via the wireless LAN interface 29.

The operation interface 23 is provided with a plurality of buttons. The operation interface 23 transmits signals, which may represent desired commands, to the CPU 21 based on user's pressing on the buttons. The display 25 is provided with a display such as an LCD. The display 25 displays various information according to commands received from the CPU 21.

The image-reading unit 27 includes a well-known reading mechanism with a flatbed type platen or an automatic document feeder (ADF) type platen, and a well-known reading mechanism. When the user inputs a read command through the operation interface 23, the CPU 21 controls the reading mechanism of the image-reading unit 27 in order to read an original document.

The memory 31 includes a memory area for storing the control program 33 and a memory area 35 for storing required information. A non-limiting example of the memory 31 may be RAM, a ROM, a flash memory, or a hard disk drive. The memory area 35 is configured to store sets of destination information specifying destinations for transmitting scan data which is generated by reading the original document. The control program 33 may be supplied on a CD-ROM or other storage medium or may be downloaded from a server on the Internet 60. The control program 33 stored in the memory 31 is executed by the CPU 21. The storage may store a URL of the cloud server 47 in advance. The URL of the cloud server 47 is location information of the cloud server 47 on the Internet 60.

Push Notification Server 45 and Cloud Server 47

The push notification server 45 is a server provided on the Internet 60 for providing a push notification service. The push notification server 45 includes a CPU (not shown). The push notification service is a service for transmitting, or "pushing," push notification information to the information processing apparatus, such as the smartphone 10, on which a particular application is installed, from any other device than the information processing apparatus. The push notification information includes various messages transmitted from a server (not shown) on the Internet 60, or the image scanner device 40, which is non-limiting examples of the any other device. The push notification information is also configured to be pushed to the smartphone 10 even when the particular application is not active on the smartphone 10. The smartphone 10 starts the particular application in response to receiving the push notification information. Some examples of platforms that provide push notification services are Google Cloud Messaging for Android (GCM) and Apple Push Notification service (APNs).

The cloud server 47 is configured to receive scan data from the image scanner device 40 and store the scan data. The cloud server 47 is provided with a CPU (not shown).

The push notification server 45 and the cloud server 47 may be typical servers. Accordingly, a description of the detailed structures provided in the push notification server 45 and the cloud server 47 will not be given here.

Notes Regarding the Descriptions in the Present Specification

In the following description, the phrase "the CPU 12 of the smartphone 10" or the phrase "the smartphone 10" may signify "the CPU 12 of the smartphone 10 executing a program such as the application 18 or the OS 20." In this specification, the phrase "the CPU 12 receives various information" may include meaning of such technical details as the CPU 12 of the smartphone 10 acquiring various information via the cellular interface 24 or the wireless LAN interface 26. Similarly, the phrase "the CPU 12 of the smartphone 10 transmits various information" may include meaning of such technical details as the CPU 12 of the smartphone 10 outputting various information via the cellular interface 24 or the wireless LAN interface 26.

Here, definitions will be provided for the terms "data" and "information". In this specification, "information" is used as a broader concept of "data". Accordingly, "data A" may be replaced with "information A." Further, "information" is treated as the same information for different formats of "data" (e.g., a text format, binary format, or flag format), provided that the content of the data can be recognized as being the same. For example, the data "RESOLUTION=300" in the text format and the data "100101100" in the binary format are the same information provided that the device treats the data as information specifying that the resolution for reading an original is 300. However, the distinction between "data" and "information" described above is not strictly enforced; exceptions to the rule may be allowed.

Operations of the Communication System

Next, the operations of the communication system 1 according to the embodiment will be described while referring to the sequence diagrams in FIGS. 2 through 7.

Destination Registration Sequence

Figure 2:
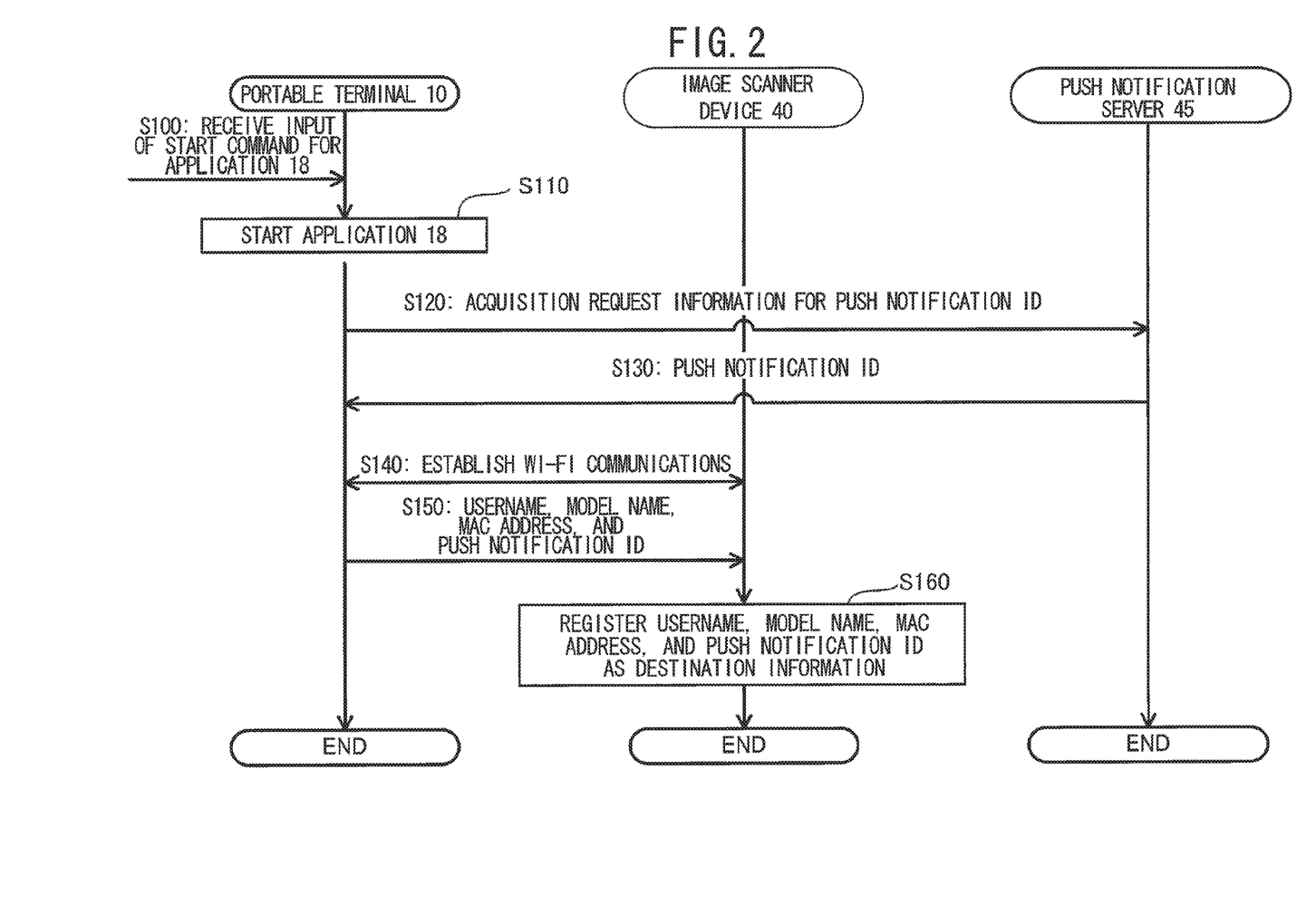
FIG. 2 is a sequence diagram for illustrating registering a destination for scan data on a scanner according to the embodiment.

FIG. 2 shows an example sequence of steps for registering the destination for scan data on the image scanner device 40. Through this example, the smartphone 10 is registered on the image scanner device 40 as a destination.

In S100 the smartphone 10 receives input of a start command for starting the application 18. The smartphone 10 may receive input for a start command when touch input is detected on the icon for the application 18 displayed on the display 30.

In S110 the CPU 12 starts the application 18. In response, the display screen for the application 18 is displayed on the display 30.

In S120 the smartphone 10 transmits to the push notification server 45 acquisition request for a push notification ID. The push notification ID is identification information that the push notification server 45 uses for identifying an external device transmitting push notification information. The push notification ID is information for identifying the smartphone 10 in this case. Note that the various data and information exchanged between the smartphone 10 and the push notification server 45 is transmitted through the wireless communications 70 and the Internet 60 when the smartphone 10 has established the Wi-Fi communications with the access point 55 and is transmitted through the wireless communications 80 and the Internet 60 when the Wi-Fi communications are not established. This will be true for all subsequent steps in the description.

In response to receiving the acquisition request for a push notification ID, in S130 the push notification server 45 transmits the push notification ID to the smartphone 10. The smartphone 10 stores the push notification ID in the memory area 22 of the memory 14.

In S140 the smartphone 10 establishes the Wi-Fi communications with the image scanner device 40 according to the infrastructure mode. Hence, a wireless connection is established between the smartphone 10 and the image scanner device 40 through the wireless communications 70 and 90. Consequently, various data and information exchanged between the smartphone 10 and the image scanner device 40 is performed through the wireless communications 70 and 90. This data exchange scheme may also be applied for all subsequent steps in the description. At this time, the smartphone 10 stores the IP address assigned thereto in the memory area 22 of the memory 14 when the Wi-Fi communications are established. The IP address is kept stored in the memory area 22 while the Wi-Fi communications are established.

In S150 the smartphone 10 transmits a username, the model name, MAC address of the smartphone 10, and the push notification ID stored in S130 to the image scanner device 40. The username transmitted in this step may be a username already stored in the smartphone 10 used for a different service on the communication system 1 or may be a username that the user inputs through the operation interface 28.

In S160 the image scanner device 40 registers destination information including the username, the model name, the MAC address, and the push notification ID received from the smartphone 10 in the memory area 35. Implementing S160 completes the destination registration sequence.

In S160, instead of the MAC address, the IP address of the device may be used in the destination information. However, the IP address is normally assigned dynamically when establishing the Wi-Fi communications. Consequently, if Wi-Fi communications between a registered device and the image scanner device 40 were to be interrupted and subsequently reestablished, an IP address different from the registered IP address may be assigned, resulting in the image scanner device 40 determining that a device matching the prerecorded dynamic IP address does not exist. Therefore, in the communication system 1 according to the embodiment, the MAC address uniquely assigned to the device may be preferably used in the destination information.

Main Sequence

Figure 3:
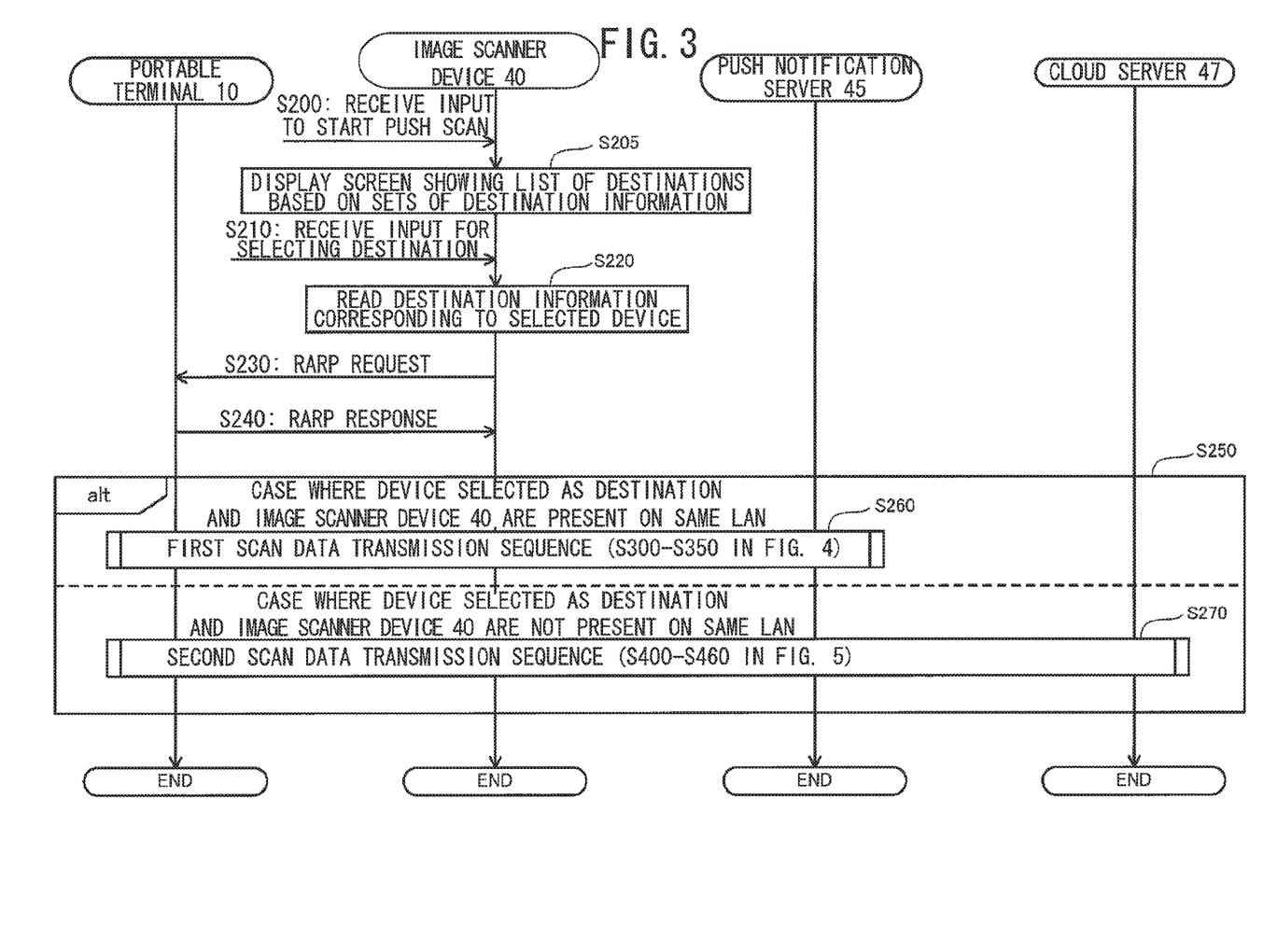
FIG. 3 is a sequence diagram for illustrating a main sequence of the system according to the embodiment.

FIG. 3 shows an example of a main sequence executed on the communication system 1 for transmitting scan data to a device registered as a destination.

In S200 the smartphone 10 receives input to start a push scan. The smartphone 10 may receive input to start a push scan when the smartphone 10 detects that the user has selected an icon which is displayed on the display 25 and specifies execution of a push scan function.

In S205 the image scanner device 40 displays a screen on the display 25 showing a list of destination(s) (not shown) based on set(s) of destination information registered in the memory area 35, such as the destination information registered in S160. The list of destinations may include one username and one model name for each set of destination in the information stored in the memory area 35.

In S210 the image scanner device 40 receives input via the operation interface 23 for selecting a destination. In this example, it will be assumed that a user has selected the smartphone 10 as the destination.

In S220 the image scanner device 40 reads the destination information from the memory area 35 that corresponds to the device selected in S210. In this case, the destination information which the image scanner device 40 reads corresponds to the smartphone 10.

In S230 the image scanner device 40 uses the MAC address included in the destination information read in S210 and broadcasts an RARP request according to the Reverse Address Resolution Protocol (RARP). Specifically, the RARP request includes the MAC address. The smartphone 10 receives the RARP request transmitted from the image scanner device 40 when the image scanner device 40 and the smartphone 10 are connected wirelessly through the wireless communications 70 and 90 (when the smartphone 10 and the image scanner device 40 exist on the same LAN). If the MAC address included in the RARP request received by the smartphone 10 matches the MAC address of the smartphone 10 registered in S160, in S240 the smartphone 10 transmits an RARP response including the IP address stored in S140 to the image scanner device 40. After receiving the RARP response from the smartphone 10, the image scanner device 40 stores the IP address included in the RARP response in the memory area 35. Through this process, the image scanner device 40 can acquire the IP address of the smartphone 10 by referring to from the MAC address of the smartphone 10. On the other hand, if a wireless connection is not established between the image scanner device 40 and the smartphone 10 (if the smartphone 10 and the image scanner device 40 do not exist on the same LAN), the image scanner device 40 does not receive an RARP response since the image scanner device 40 and the smartphone 10 are unable to communicate with each other.

In S250 the image scanner device 40 determines whether the device selected as the destination (i.e., the smartphone 10) and the image scanner device 40 exist on the same LAN. This determination is made based on whether an RARP response was received in S240 within a prescribed period. When determining that the smartphone 10 and the image scanner device 40 exist on the same LAN in S250, the image scanner device 40 executes a first scan data transmission sequence in S260 (FIG. 4 explained later) to transmit the scan data to the smartphone 10. On the other hand, when the image scanner device 40 determines that the smartphone 10 and the image scanner device 40 do not exist on the same LAN, the image scanner device 40 executes a second scan data transmission sequence in S270 (FIG. 5 explained later) to transmit the scan data to the cloud server 47. In the second scan data transmission sequence, the smartphone 10 receives the scan data from the cloud server 47. As described above, because one of the first scan data transmission sequence and the second scan data transmission sequence is selectively performed on the basis of the determination result of whether the smartphone 10 and the image scanner device 40 exist on the same LAN, a case where the first scan data transmission sequence is performed is incompatible with a case where the second scan data transmission sequence is performed.

The main sequence concludes once the image scanner device 40 has performed the first scan data transmission sequence or the second scan data transmission sequence. Hence, once the image scanner device 40 receives input to start a push scan in the main sequence described above, a push scan function is implemented. Here, in the push scan function, the image scanner device 40 transmits scan data to the smartphone 10 or the cloud server 47, and the smartphone 10 receives the scan data from the image scanner device 40 or the cloud server 47.

Note that steps S230, S240, S250, and S270 may be omitted.

First Scan Data Transmission Sequence

Figure 4:
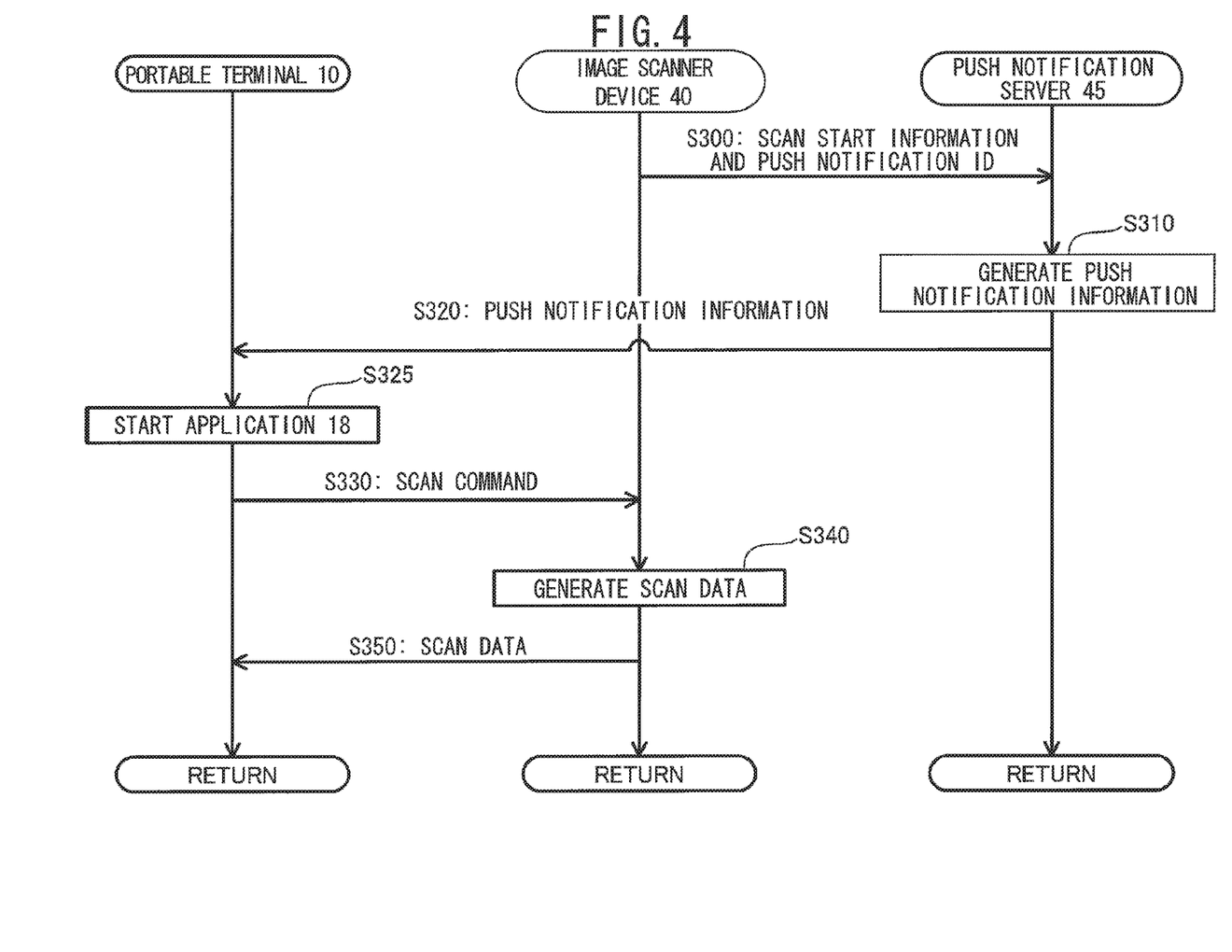
FIG. 4 is a sequence diagram for illustrating a first scan data transmission sequence transmitting the scan data from the scanner to a portable terminal registered as the destination according to the embodiment.

FIG. 4 shows an example of the first scan data transmission sequence for transmitting scan data to the smartphone 10 executed when the smartphone 10 and the image scanner device 40 exist on the same LAN.

In S300 the image scanner device 40 transmits scan start information and a push notification ID included in the destination information read in S220 to the push notification server 45. The scan start information indicates the start of a push scan. The push notification server 45 subsequently receives the scan start information and the push notification ID from the smartphone 10.

In S310 the push notification server 45 generates push notification information that includes the scan start information received in S300. The push notification information includes various messages and is to be transmitted via a push notification service.

In S320 the push notification server 45 transmits the push notification information generated in S310 to an external device identified by the push notification ID received in S300. In this example, the push notification ID identifies the smartphone 10. Therefore, the smartphone 10 subsequently receives the push notification information from the push notification server 45.

In S325 the smartphone 10 starts the application 18 on the basis of the push notification information received in S320.

In S330 the smartphone 10 transmits a scan command to the image scanner device 40 via the application 18. The image scanner device 40 subsequently receives the scan command from the smartphone 10.

In S340 the image scanner device 40 generates scan data by reading an original with the image reading unit 27 on the basis of the scan command received in S330.

In S350 the image scanner device 40 transmits the scan data generated in S340 to the smartphone 10. The smartphone 10 subsequently receives the scan data from the image scanner device 40 via the application 18.

Implementing S350 completes the first scan data transmission sequence.

Second Scan Data Transmission Sequence

Figure 5:
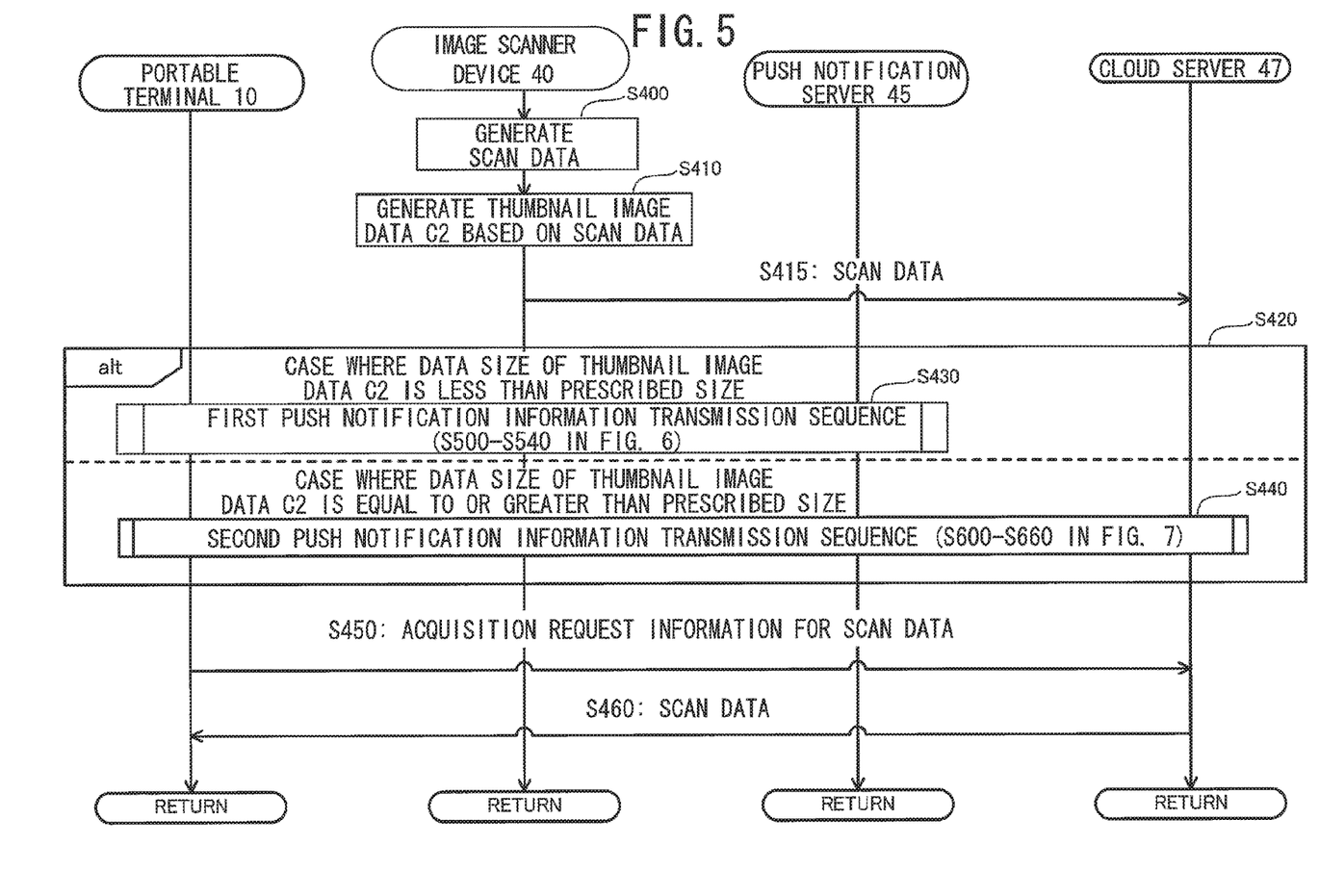
FIG. 5 is a sequence diagram for illustrating a second scan data transmission sequence transmitting the scan data from the scanner to a cloud server according to the embodiment.

FIG. 5 is an example of the second scan data transmission sequence for transmitting scan data to the cloud server 47 executed when the smartphone 10 and the image scanner device 40 do not exist on the same LAN.

In S400 the image scanner device 40 generates scan data. In S410 the image scanner device 40 generates thumbnail image data C2 based on the scan data. Here, the thumbnail image data C2 represents a thumbnail image of the scan data.

In S415 the image scanner device 40 transmits the scan data generated in S400 to the cloud server 47. The cloud server 47 subsequently receives the scan data from the image scanner device 40.

In S420 the image scanner device 40 determines whether the data size of the thumbnail image data C2 generated in S410 is less than a prescribed size. An example of the prescribed size is the data size obtained by subtracting, from a preset maximum payload size (e.g., 4096 bytes), the data sizes of scan complete information, information specifying the URL of the cloud server 47, and the push notification ID. Here, the preset maximum payload size denotes the largest size of data that can be transmitted to the push notification server 45. When the image scanner device 40 determines in S420 that the data size of the thumbnail image data C2 is less than the prescribed size, the image scanner device 40 executes a first push notification information transmission sequence in S430 (FIG. 6 explained later) for transmitting push notification information including the thumbnail image data C2 to the smartphone 10 via the push notification server 45. However, when the data size of the thumbnail image data C2 is greater than or equal to the prescribed size, the image scanner device 40 executes a second push notification information transmission sequence in S440 (FIG. 7 explained later) for transmitting the thumbnail image data C2 to the smartphone 10 via the cloud server 47. As described above, because one of the first push notification information transmission sequence and the second push notification information transmission sequence is selectively performed on the basis of the determination result of whether the data size of the thumbnail image data C2 is less than the prescribed size, a case where the first push notification information transmission sequence is performed is incompatible with a case where the second push notification information transmission sequence is performed.

The process advances to S450 after the image scanner device 40 completes one of the first or second push notification information transmission sequences.

In S450 the smartphone 10 transmits to the cloud server 47 acquisition request for scan data. The cloud server 47 subsequently receives the acquisition request for scan data from the smartphone 10.

As a response to receiving the acquisition request, in S460 the cloud server 47 transmits the scan data to the smartphone 10. Implementing S460 completes the second scan data transmission sequence.

First Push Notification Information Transmission Sequence

Figure 6:
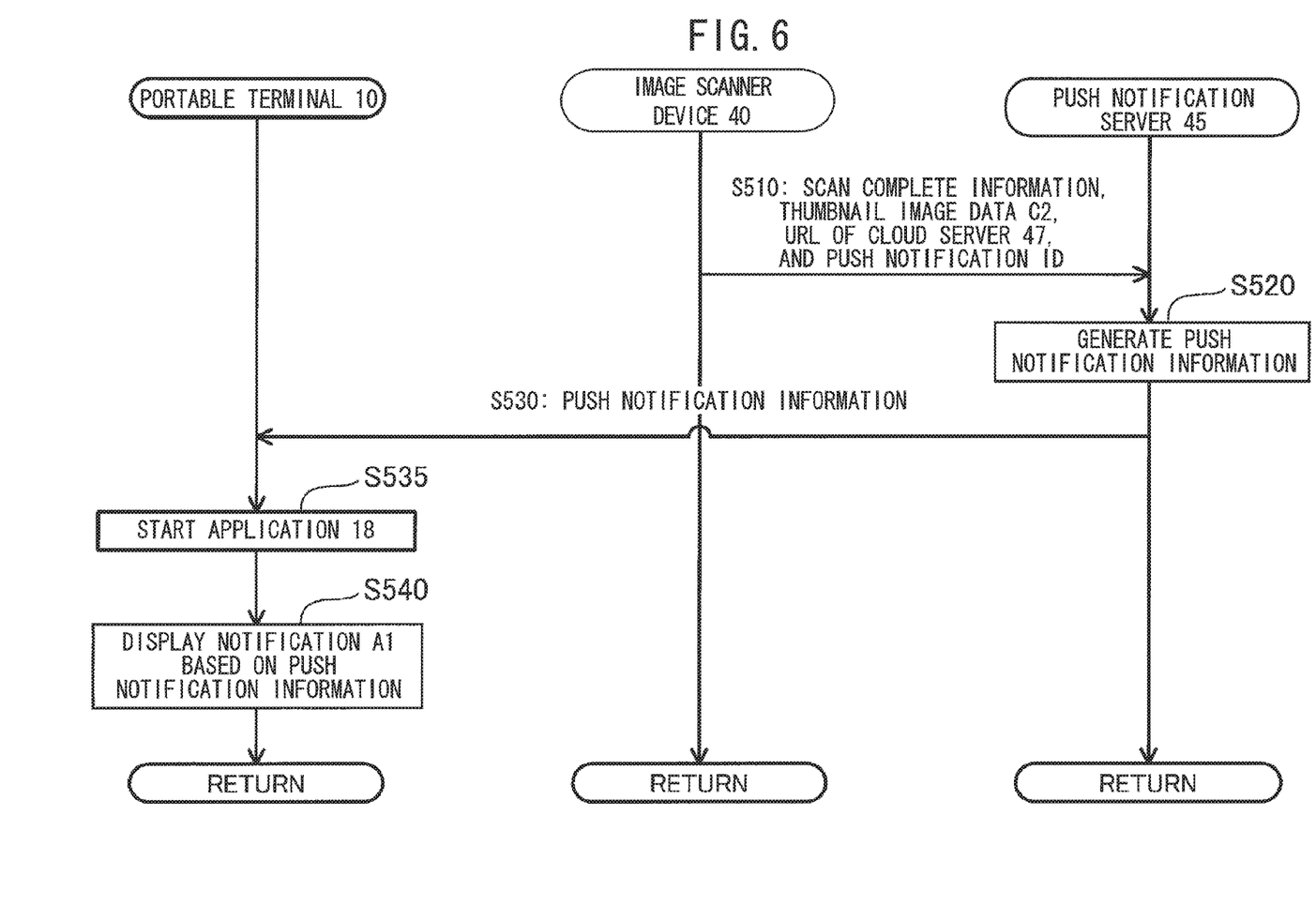
FIG. 6 is a sequence diagram for illustrating transmitting push notification information including thumbnail image data to the portable terminal from the scanner via a push notification server according to the embodiment.

FIG. 6 shows an example of the first push notification information transmission sequence executed when the data size of the thumbnail image data C2 is less than the prescribed size. Through this sequence, the push notification information including the thumbnail image data C2 is transmitted to the smartphone 10 via the push notification server 45.

In S510 the image scanner device 40 transmits scan complete information, the thumbnail image data C2 generated in S410, the URL of the cloud server 47, and the push notification ID included in the destination information read in S220 (FIG. 3) to the push notification server 45. The scan complete information specifies that the scanning operation completes. The push notification server 45 subsequently receives the scan complete information, the thumbnail image data C2, the URL of the cloud server 47, and the push notification ID.

In S520 the push notification server 45 generates push notification information that includes the scan complete information, the thumbnail image data C2, and the URL of the cloud server 47 received in S510.

In S530 the push notification server 45 transmits the push notification information generated in S520 to the external device identified by the push notification ID received in S510. In this example, the push notification ID identifies the smartphone 10. Therefore, the smartphone 10 subsequently receives the push notification information from the push notification server 45.

In S535 the smartphone 10 starts the application 18 on the basis of the push notification information.

In S540 the smartphone 10 displays a notification A1 on the display 30 based on the push notification information received in S530 (see FIG. 8) via the application 18. The notification A1 includes the thumbnail image represented by the thumbnail image data C2, and a message C1 based on the scan complete information, such as "You have received a notification to execute a push scan." Implementing S540 completes the first push notification information transmission sequence.

Second Push Notification Information Transmission Sequence

Figure 7:
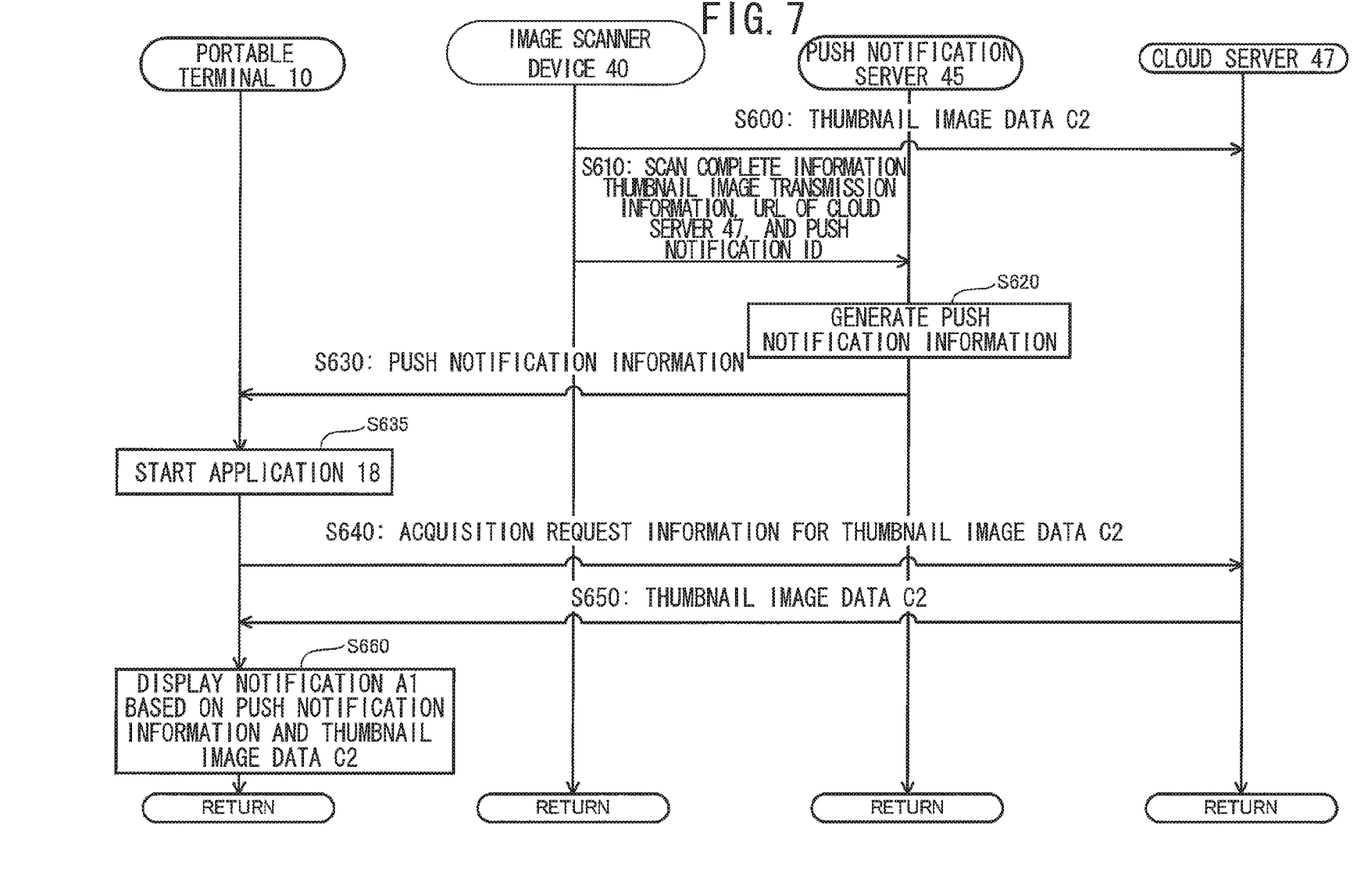
FIG. 7 is for illustrating transmitting a push notification information including thumbnail image transmission information to the portable terminal from the scanner via the push notification server.

FIG. 7 shows an example of the second push notification information transmission sequence executed when the data size of the thumbnail image data C2 is greater than or equal to the prescribed size. Through this sequence, the push notification information including thumbnail image transmission information is transmitted to the smartphone 10 via the push notification server 45.

In S600 the image scanner device 40 transmits the thumbnail image data C2 generated in S410 to the cloud server 47. The cloud server 47 subsequently receives the thumbnail image data C2 from the image scanner device 40.

In S610 the image scanner device 40 transmits the scan complete information, thumbnail image transmission information, the URL of the cloud server 47, and the push notification ID included in the destination information read in S220 to the push notification server 45. The thumbnail image transmission information indicates that the thumbnail image data C2 has been transmitted to the cloud server 47. The push notification server 45 subsequently receives the scan complete information, the thumbnail image transmission information, the URL of the cloud server 47, and the push notification ID.

In S620 the push notification server 45 generates push notification information that includes the scan complete information, the thumbnail image transmission information, and the URL of the cloud server 47.

In S630 the push notification server 45 transmits the push notification information generated in S620 to the external device identified by the push notification ID received in S610. Since the smartphone 10 is the external device identified by the push notification ID in this example, the smartphone 10 subsequently receives the push notification information from the push notification server 45.

In S635 the smartphone 10 starts the application 18 on the basis of the push notification information received in S630.

When the push notification information includes the thumbnail image transmission information, in S640 the smartphone 10 transmits acquisition request for the thumbnail image data C2 to the cloud server 47 on the basis of the URL of the cloud server 47 by using the application 18. The cloud server 47 subsequently receives the acquisition request for the thumbnail image data C2 from the smartphone 10.

In S650 the cloud server 47 transmits the thumbnail image data C2 received in S600 to the smartphone 10. The smartphone 10 subsequently receives the thumbnail image data C2 from the cloud server 47.

In S660 the smartphone 10 displays the notification A1 (see FIG. 8) on the display 30 on the basis of the push notification information received in S630 and the thumbnail image data C2 received in S650. The notification A1 includes the thumbnail image represented by the thumbnail image data C2 based on the scan complete information, and the message C1, such as "You have received a notification to execute a push scan."

Implementing S660 completes the second push notification information transmission sequence.

Effects of the Embodiment

When the image scanner device 40 receives input indicating the start of a push scan in the embodiment described above (S200), the image scanner device 40 transmits push notification information including scan start information to the smartphone 10 via the push notification server 45 (S300-S320). If the image scanner device 40 subsequently receives a scan command from the smartphone 10, the image scanner device 40 transmits scan data to the smartphone 10 (S330-S350). Here, the smartphone 10 has transmitted the scan command to the image scanner device 40 as a response to receiving the push notification information. Hence, the smartphone 10 can receive scan data from the image scanner device 40 without starting a program e.g., an application, installed on the smartphone 10 prior to receiving the push notification information.

Further, when the smartphone 10 has been selected as the destination in the above configuration (S210), the image scanner device 40 determines whether the smartphone 10 and the image scanner device 40 exist on the same LAN (S250). If the smartphone 10 and the image scanner device 40 exist on the same LAN, the image scanner device 40 transmits the scan data to the smartphone 10 (S350). When the smartphone 10 and the image scanner device 40 do not exist on the same LAN, the image scanner device 40 transmits the scan data to the cloud server 47 (S415), and the smartphone 10 receives the scan data from the cloud server 47 (S460). Accordingly, scan data can be received by the smartphone 10 from the image scanner device 40 via the cloud server 47 without establishing direct communications between the smartphone 10 and the image scanner device 40.

In the embodiment described above, the image scanner device 40 uses the MAC address unique to the device selected as the destination to determine whether the smartphone 10 and the image scanner device 40 exist on the same LAN. Accordingly, the image scanner device 40 can reliably determine whether the smartphone 10 exists on the LAN on which the image scanner device 40 exists.

In the embodiment described above, the image scanner device 40 generates a thumbnail image data C2 for the scan data (S410) and transmits the thumbnail image data C2 to the push notification server 45 (S510). In response to receiving push notification information from the push notification server 45, the smartphone 10 displays the thumbnail image represented by the thumbnail image data C2 included in the push notification information on the display 30. Hence, by viewing the thumbnail image represented by the thumbnail image data C2 displayed on the display 30, the user can recognize the content of the scan data.

Further, if the data size of the thumbnail image data C2 is greater than or equal to a prescribed size in the embodiment described above, the image scanner device 40 transmits the thumbnail image data C2 to the cloud server 47 (S600) and the smartphone 10 receives the thumbnail image data C2 from the cloud server 47 after receiving push notification information from the push notification server 45 (S630-S650). Accordingly, the smartphone 10 can receive the thumbnail image data C2 from the image scanner device 40 via the cloud server 47, even when the data size of the thumbnail image data C2 is greater than or equal to the prescribed size, in other words even when the data size of the thumbnail image data C2 is too large so the thumbnail image data C2 cannot be included in the push notification information.

Variations of the Embodiment

In S250, instead of the MAC address, a preset static IP address for the smartphone 10 may be used.

In the embodiment, the image scanner device 40 generates thumbnail image data C2 represents a thumbnail image of the scan data. Instead, the smartphone 10 may be configured to generate the thumbnail image data C2 after receiving the scan data (S350) and may display the thumbnail image represented by the thumbnail image data C2 on the display 30.

Figure 8:
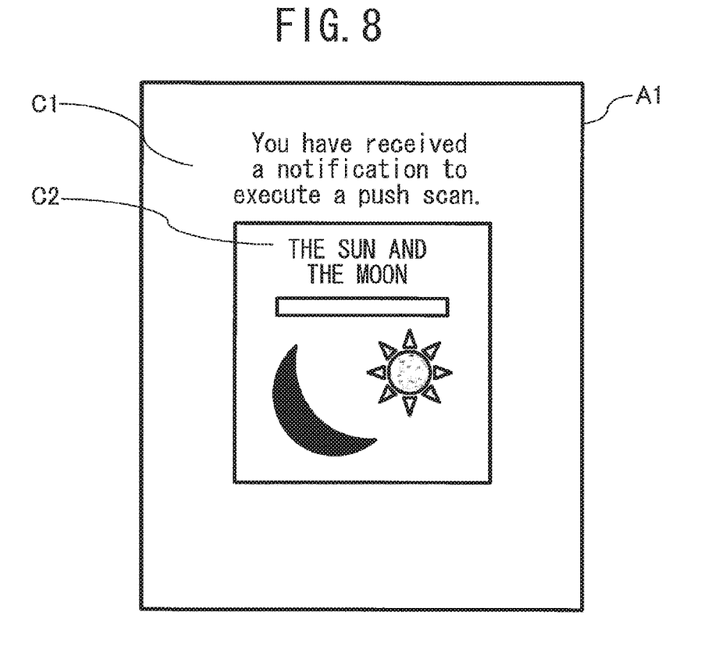
FIG. 8 is an explanatory diagram illustrating an example of a notification displayed on a display of the portable terminal according to the embodiment.
Figure 9:
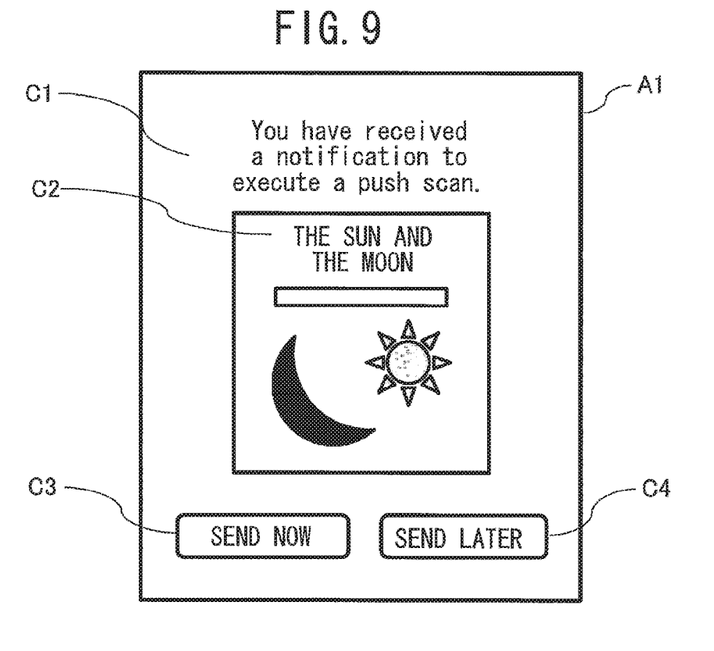
FIG. 9 is an explanatory diagram illustrating another example of a notification displayed on a display of the portable terminal according to a modification of the embodiment.

In the embodiment described above, the smartphone 10 automatically transmits information to the cloud server 47 requesting the acquisition of scan data (S450) in response to receiving a push notification. Instead, the following process may also be employed. In S540 or S660, the smartphone 10 may display the notification A1 shown in FIG. 9 on the display 30. The notification A1 in FIG. 9 includes the message C1, the thumbnail image represented by the thumbnail image data C2, a "Send Now" button C3, and a "Send Later" button C4. The smartphone 10 advances to S450 when the user selects the "Send Now" button C3. On the other hand, the smartphone 10 ends the second scan data transmission sequence when the user activates the "Send Later" button C4. After the second scan data transmission sequence is ended in response to activating the "Send Later" button C4, the smartphone 10 may receive the scan data from the cloud server 47 triggered by a subsequently performed user's operation on the application 18.

In the embodiment, the image scanner device 40 generates scan data (S340) in response to receiving a scan command (S330). Instead, the image scanner device 40 may be configured to generate scan data in response to receiving input for starting a push scan (S200). In this case, the smartphone 10 transmits acquisition request, instead of the scan command, for the scan data (S330), and the image scanner device 40 may transmit the scan data to the smartphone 10 in response to receiving the acquisition request for the scan data from the smartphone 10. In this case, the image scanner device 40 transmits the scan complete information, instead of the scan start information, to the push notification server 45 (S300).

In the second scan data transmission sequence of the embodiment, the image scanner device 40 determines the data size of the thumbnail image data C2 (S420) after generating the scan data and the thumbnail image data C2 (S400 and S410), and sets the destination for transmitting the thumbnail image data C2 to the cloud server 47 or the push notification server 45 on the basis of this determination. However, the image scanner device 40 may simply transmit the thumbnail image data C2 to the cloud server 47 without executing step S420. In this case, the smartphone 10 may issue acquisition request to the cloud server 47 for both the scan data and the thumbnail image data C2 in S450.

When all or part of the functions in the present disclosure are implemented by computer programs, the programs may be stored on a computer-readable storage medium. The programs may be held in the original computer-readable storage medium while executed, or may be copied to another computer-readable storage medium before executed such that the programs in the another computer-readable storage medium may be executed. The "computer-readable storage medium" may be a portable medium, such as a memory card or CD-ROM; an internal storage device built into the computer, such as any of various ROM; or an external storage device, such as a hard disk drive connected to the computer.

It would be apparent to those skilled in the art that various changes and modifications may be made to the embodiment. For example, an order of the processes described above may be modified properly.

The image scanner device 40 is an example of an image reading apparatus. The push notification ID is an example of device identification information. The scan start information and the scan complete information are examples of reading information regarding reading. The scan command is an example of request information. The URL of the cloud server 47 is an example of location information of a cloud server on the network. The MAC address is an example of static identification information. The acquisition request for the scan data is an example of second request information. The acquisition request for the thumbnail C2 is an example of third request information.

The CPU 21 of the image scanner device 40 executing S200 is an example of a processor receiving an input. The CPU 21 executing S340 and S400 is an example of a processor generating image data. The CPU 21 executing S220 is an example of a processor receiving device identification information. The CPU 21 executing S300 is an example of a processor transmitting the device identification information and the reading information. The CPU 21 executing S330 is an example of a processor receiving request information. The CPU 21 executing S350 is an example of a processor transmitting image data in a first process. The CPU 21 executing S415 is an example of a processor transmitting image data in a second process. The CPU 21 executing S510 and S610 is an example of a processor transmitting device identification information, reading information, and location information. The CPU 21 executing S250 is an example of a processor determining about a local area network. The CPU 21 executing S600 is an example of a processor transmitting thumbnail image data. The CPU 21 executing S420 is an example of a processor determining about data size. The CPU of the push notification server 45 executing S300 is an example of a second processor receiving reading information and device identification information. The CPU of the push notification server 45 executing S310 is an example of a second processor generating a first push notification. The CPU of the push notification server 45 executing S320 is an example of a second processor transmitting first push notification information. The CPU 12 of S320 is an example of a third processor receiving a first push notification information. The CPU 12 executing S330 is an example of a third processor transmitting a first request. The CPU 12 executing S350 is an example of a third processor receiving image data. The CPU of the push notification server 45 executing S510 and S610 is an example of a second processor receiving device identification information, reading information, and location information. The CPU of the push notification server 45 executing S520 and S620 is an example of a second processor generating push notification information. The CPU of the push notification server 45 executing S530 and S630 is an example of a second processor transmitting push notification information. The CPU of the push notification server 45 executing S415 is an example of a second processor receiving image data. The CPU of the cloud server 47 executing S450 is an example of a fourth processor receiving request information. The CPU of the cloud server 47 executing S460 is a fourth processor transmitting image data. The CPU 12 executing S530 and S630 is an example of a third processor transmitting push notification information. The CPU 12 executing S450 is an example of a third processor transmitting request information. The CPU 12 executing S460 is an example of a third processor receiving image data. The CPU 12 executing S540 is an example of a third processor displaying a notification. The CPU of the cloud server 47 executing S600 is an example of a fourth processor receiving thumbnail image data. The CPU of the cloud server 47 executing S640 is an example of a fourth processor receiving request information. The CPU of the cloud server 47 executing S650 is an example of a fourth processor transmitting thumbnail image data. The CPU 12 executing S640 is an example of a third processor transmitting request information. The CPU 12 executing S650 is an example of a third processor receiving thumbnail image data. The CPU 12 executing S660 is an example of a third processor displaying push notification.

S200 is an example of receiving an input. S340 and S400 are examples of generating. S220 is an example of receiving device identification information. S300 is an example of transmitting the received device identification information and reading information. S330 is an example of receiving request information. S350 is an example of transmitting the generated image data.

What is claimed is:

1. An image reading apparatus comprising:
   an operation interface;
   a scanner;
   a communication interface;
   a processor; and
   a memory storing computer readable instructions, the computer readable instructions, when executed by the processor, causing the image reading apparatus to perform:
   receiving via the operation interface an input instructing to control the scanner to read an original;
   controlling the scanner to generate image data by reading the original on a basis of the input;
   receiving device identification information identifying an information processing apparatus from the information processing apparatus via the communication interface; and
   executing a first process including:
   transmitting to a push notification server via the communication interface the received device identification information and reading information, the reading information including at least one of information specifying the controlling the scanner is started and information specifying the controlling the scanner is complete;
   receiving request information from the information processing apparatus via the communication interface, wherein the request information is transmitted from the information processing apparatus when the information processing apparatus receives a push notification including the reading information from the push notification server; and
   transmitting the generated image data to the information processing apparatus via the communication interface in response to receiving the request information.

2. The image reading apparatus according to claim 1, wherein the memory further stores location information of a cloud server on a network,
   wherein the instructions stored in the memory, when executed by the processor, cause the image reading apparatus to further perform executing a second process including:
   transmitting the generated image data to the cloud server via the communication interface; and
   transmitting to the push notification server via the communication interface the received device identification information, the reading information, and the stored location information.

3. The image reading apparatus according to claim 2, wherein the instructions stored in the memory, when executed by the processor, cause the image reading apparatus to further perform determining whether a prescribed condition is met, the prescribed condition including a condition that the image reading apparatus and the information processing apparatus exist on a same local area network,
   wherein the first process is executed in a case where it is determined that the prescribed condition is met whereas the second process is executed in a case where it is determined that the prescribed condition is not met.

4. The image reading apparatus according to claim 2, wherein the memory further stores static identification information identifying the information processing apparatus,
   wherein the instructions stored in the memory, when executed by the processor, cause the image reading apparatus to further perform determining whether a prescribed condition is met on a basis of the static identification information, the prescribed condition including a condition that the image reading apparatus and the information processing apparatus exist on a same local area network,
   wherein the first process is executed in a case where it is determined that the prescribed condition is met whereas the second process is executed in a case where it is determined that the prescribed condition is not met.

5. The image reading apparatus according to claim 4, wherein the static identification information is a MAC address of the information processing apparatus.

6. The image reading apparatus according to claim 5, wherein the instructions stored in the memory, when executed by the processor, cause the image reading apparatus to further perform broadcasting a RARP request including the MAC address according to a Reverse Address Resolution Protocol,
   wherein the prescribed condition further includes a condition that the communication interface receives an IP address assigned to the information processing apparatus.

7. The image reading apparatus according to claim 2, wherein the instructions stored in the memory, when executed by the processor, cause the image reading apparatus further perform:
   generating thumbnail image data representing a thumbnail image of an image represented by the image data; and
   transmitting the generated thumbnail image data to the push notification server via the communication interface concurrently with the transmitting the received device identification information, the reading information, and the location information.

8. The image reading apparatus according to claim 2, wherein the instructions stored in the memory, when executed by the processor, cause the image reading apparatus to further perform:
   generating thumbnail image data representing a thumbnail image of an image represented by the image data;
   transmitting the generated thumbnail image data to the cloud server via the communication interface; and
   transmitting, concurrently with the received device identification information, the reading information, and the stored location information, to the push notification server via the communication interface thumbnail image transmission information indicating that the thumbnail image data is transmitted to the cloud server.

9. The image reading apparatus according to claim 2, wherein the instructions stored in the memory, when executed by the processor, cause the image reading apparatus to further perform:
generating thumbnail image data representing a thumbnail image of an image represented by the image data;
determining whether a data size of the thumbnail image data is greater than or equal to a prescribed size; and
transmitting the generated thumbnail image data to the push notification server via the communication interface concurrently with the transmitting the received device identification information, the reading information, and the location information in a case where the data size of the thumbnail image data is smaller than the prescribed size;
transmitting the generated thumbnail image data to the cloud server via the communication interface in a case where the data size of the thumbnail image data is greater than or equal to the prescribed size; and
transmitting, concurrently with the received device identification information, the reading information, and the stored location information, to the push notification server via the communication interface thumbnail image transmission information indicating that the thumbnail image data is transmitted to the cloud server after the generated thumbnail image data is transmitted to the cloud server.

10. An image reading apparatus comprising:
an operation interface;
a scanner;
a communication interface;
a processor; and
a memory storing computer readable instructions, the computer readable instructions, when executed by the processor, causing the image reading apparatus to perform:
receiving via the operation interface an input instructing to control the scanner to read an original;
controlling the scanner to generate image data by reading the original on a basis of the input;
receiving device identification information identifying an information processing apparatus from the information processing apparatus via the communication interface;
determining whether the image reading apparatus and the information processing apparatus exist on a same local area network (LAN); and
transmitting to a push notification server via the communication interface the received device identification information and reading information on reading the original, where information included in the transmitted reading information is at least based on the determination of whether the image reading apparatus and the information processing apparatus exist on the same LAN, the transmission being for prompting the push notification server to transmit to the information processing apparatus push notification information including the reading information.

11. The image reading apparatus according to claim 10, wherein when it is determined that the image reading apparatus and the information processing apparatus exist on the same LAN, the reading information comprises at least information specifying the controlling the scanner is started,
wherein when it is determined that the image reading apparatus and the information processing apparatus exist on the same LAN, the memory further stores computer readable instructions, when executed by the processor, causing the image reading apparatus to perform:
receiving request information from the information processing apparatus via the communication interface, the request information being transmitted from the information processing apparatus after the information processing apparatus receives the push notification information from the push notification server, wherein the controlling the scanner to generate image data is performed according to the received request information; and
transmitting the generated image data to the information processing apparatus via the communication interface according to the request information.

12. The image reading apparatus according to claim 10, wherein when it is determined that the image reading apparatus and the information processing apparatus do not exist on the same LAN, the memory further stores computer readable instructions, when executed by the processor, causing the image reading apparatus to perform transmitting the generated image data to a server, and
wherein when it is determined that the image reading apparatus and the information processing apparatus do not exist on the same LAN, the reading information includes location information of the server.

13. The image reading apparatus according to claim 10, wherein when it is determined that the image reading apparatus and the information processing apparatus do not exist on the same LAN, the memory further stores computer readable instructions, when executed by the processor, causing the image reading apparatus to perform determining a size of thumbnail image data which is generated from the image data.

14. The image reading apparatus according to claim 13, wherein when it is determined that the image reading apparatus and the information processing apparatus do not exist on the same LAN and when the size of the thumbnail image data is less than a threshold, the reading information comprises at least information specifying the controlling the scanner is complete and the thumbnail image data.

15. The image reading apparatus according to claim 13, wherein when it is determined that the image reading apparatus and the information processing apparatus do not exist on the same LAN and when the size of the thumbnail image data is greater than or equal to a threshold, the memory further stores computer readable instructions, when executed by the processor, causing the image reading apparatus to transmit the thumbnail image data to a server, and
wherein when it is determined that the image reading apparatus and the information processing apparatus do not exist on the same LAN and when the size of the thumbnail image data is greater than or equal to the threshold, the reading information comprises location information of the server.

16. A method for controlling an image reading apparatus including an operation interface, a scanner, a communication interface, and a memory storing location information of a cloud server on a network, the method comprising:
receiving via the operation interface an input instructing to control the scanner to read an original;
controlling the scanner to generate image data by reading the original on a basis of the input;
receiving device identification information identifying an information processing apparatus from the information processing apparatus via the communication interface;

determining whether a prescribed condition is met, the prescribed condition including a condition that the image reading apparatus and the information processing apparatus exist on a same local area network;

in a case where it is determined that the prescribed condition is met, executing a first process including:

transmitting to a push notification server via the communication interface the received device identification information and reading information, the reading information including at least one of information specifying the controlling the scanner is started and information specifying the controlling the scanner is complete;

receiving request information from the information processing apparatus via the communication interface, wherein the request information is transmitted when the information processing apparatus receives a push notification including the reading information from the push notification server; and     transmitting the generated image data to the information processing apparatus via the communication interface in response to receiving the request information; and in a case where it is determined that the prescribed condition is not met, executing a second process including:

transmitting the generated image data to the cloud server via the communication interface; and     transmitting to the push notification server via the communication interface the received device identification information, the reading information, and the stored location information.

17. The method according to claim 16, wherein the memory further stores static identification information identifying the information processing apparatus,     wherein it is determined whether the prescribed condition is met on a basis of the static identification information.

18. The method according to claim 17, wherein the static identification information is a MAC address of the information processing apparatus.

19. The method according to claim 18, further comprising broadcasting a RARP request including the MAC address according to a Reverse Address Resolution Protocol,     wherein the prescribed condition further includes a condition that the communication interface receives an IP address assigned to the information processing apparatus.

* * * * *